No. 858,526. PATENTED JULY 2, 1907.
J. W. MILLER.
FLAT IRON HEATER.
APPLICATION FILED APR. 23, 1906.
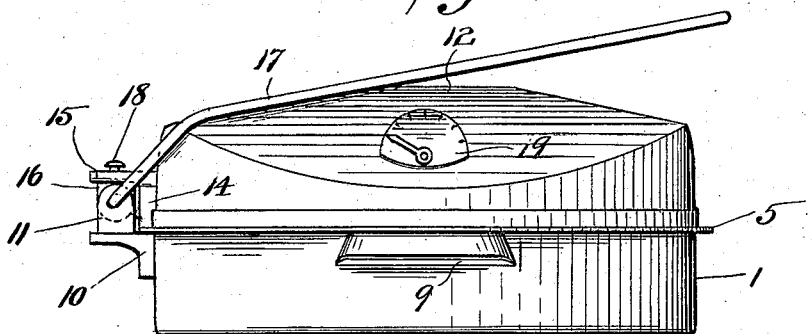
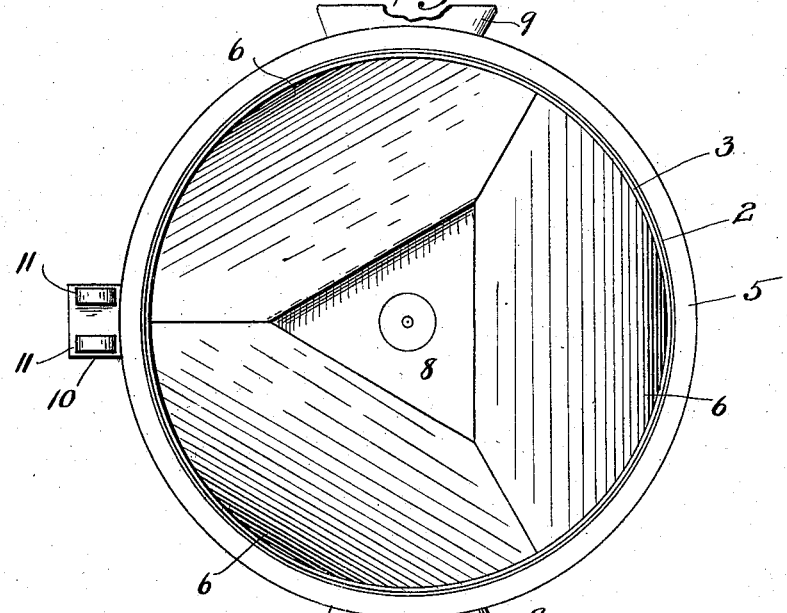
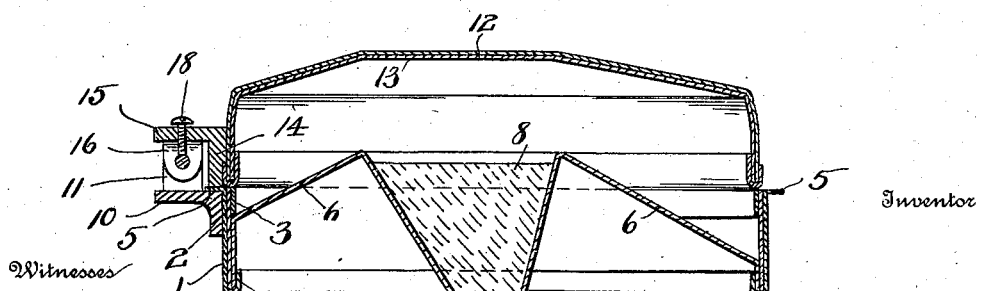
THE NORRIS PETERS CO., WASHINGTON, D. C.

UNITED STATES PATENT OFFICE.

JASPER W. MILLER, OF GREEN BAY, WISCONSIN.

FLAT-IRON HEATER.

No. 858,526.  Specification of Letters Patent.  Patented July 2, 1907.

Application filed April 23, 1906. Serial No. 313,200.

*To all whom it may concern:*

Be it known that I, JASPER W. MILLER, a citizen of the United States, residing at Green Bay, in the county of Brown and State of Wisconsin, have invented certain new and useful Improvements in Flat-Iron Heaters, of which the following is a specification.

My invention relates to devices for heating flat irons and has for its object the provision of a covered receptacle provided with a plurality of heating surfaces on which the flat irons are placed, the top and sides of the receptacle being lined with asbestos to prevent radiation of the heat. Said receptacle is adapted to be set over an opening in the top of an ordinary kitchen range or a liquid or gaseous fuel burner and is provided with an inverted pyramidal projection in the center thereof, made of sheet metal and filled with asbestos, said projection having a face opposite each of the heating surfaces designed to deflect the hot gases onto said heating surfaces.

My invention will be described in detail hereinafter and illustrated in the accompanying drawings in which—

Figure 1 is a side view of my improved flat iron heater, Fig. 2, a plan view with the cover removed, and, Fig. 3, a vertical sectional view.

In the drawing similar reference characters indicate corresponding parts throughout the several views.

My improved flat iron heater comprises a casing 1 preferably made circular having an inter-lining 2 of asbestos or other non-radiator of heat held in place by means of a ring 3 around the inner side of the upper edge of casing 1 and by bending the lower edge of the casing upward as shown at 4. The upper edge of the casing is bent laterally to form a ledge 5. Secured to the casing 1 is the heating portion of my device consisting of a plurality of inclined surfaces 6 higher toward the center than next to the casing, as shown, while depending from the central portion is an inverted pyramidal structure 7 having each of its flat surfaces opposite to one of the inclined surfaces 6. I have shown the heating surface formed of three pieces of sheet metal each of which is bent to form one of the inclined surfaces 6 and one side of the pyramidal structure 7 and joined at its edges to form the complete heating surface but I do not confine myself to this specific structure as the heating surface may be made in any other workmanlike manner without affecting the spirit of my invention. The purpose of the pyramidal projection 7 is to deflect the heated gases that strike it onto the heating surfaces 6, and, to prevent said projection from absorbing heat, I fill it with asbestos 8. 9 represents ears on the sides of casing 1 for handling the device.

10 represents a bracket secured to casing 1 and having upright, perforated ears 11 thereon.

12 represents a cover with its inner side lined with asbestos 13 and having a bracket 14 secured thereto with a lateral projection 15 thereon and a perforated lug 16 depending from said projection, said lug being adapted to seat between ears 11 when the cover 12 is in position.

17 represents an angular rod having one end inserted through the holes in ears 11 and lug 16 and secured by means of a set screw 18 so that its free end serves as a handle for operating cover 12.

19 represents a heat indicator secured in cover 12.

In use the device is set over an opening in the top of a stove or range or over a burner of a gaseous or liquid fuel stove. The flat irons, which are of the removable handle type, are placed on one of the surfaces 6 where because of the structure above described they are soon heated.

Having thus described my invention what I claim is—

1. A flat iron heater comprising a cylindrical casing, a series of flat heating surfaces secured around the inner side of said casing and leaving an angular open portion in the center, and an inverted pyramidal structure secured to the sides of said angular open portion to deflect heat to the heating surfaces aforesaid, substantially as shown and described.

2. A flat iron heater comprising a cylindrical casing, a series of flat heating surfaces secured around the inner side of said casing and leaving an angular open portion in the center, and an inverted pyramidal structure depending from the sides of said open portion and filled with asbestos, said pyramidal structure being adapted to deflect heat onto said heating surfaces, substantially as shown and described.

3. A flat iron heater comprising a cylindrical casing having a cover pivotally secured thereto, a series of flat heating surfaces secured around the inner side of said casing and leaving an angular open portion in the center, and an inverted pyramidal structure secured to the sides of said angular open portion to deflect heat to the heating surfaces aforesaid, substantially as shown and described.

4. A flat iron heater comprising a cylindrical casing having a cover pivotally secured thereto, a series of flat heating surfaces secured around the inner side of said casing and leaving an angular open portion in the center, and an inverted pyramidal structure depending from the sides of said open portion and filled with asbestos, said pyramidal structure being adapted to deflect heat onto said heating surfaces, substantially as shown and described.

In testimony whereof I hereto affix my signature in the presence of two witnesses.

JASPER W. MILLER.

Witnesses:
  MARGARET C. BROWN,
  J. F. MARTIN.